No. 634,393. Patented Oct. 3, 1899.
H. COMPTON.
HOE.
(Application filed July 11, 1899.)
(No Model.)
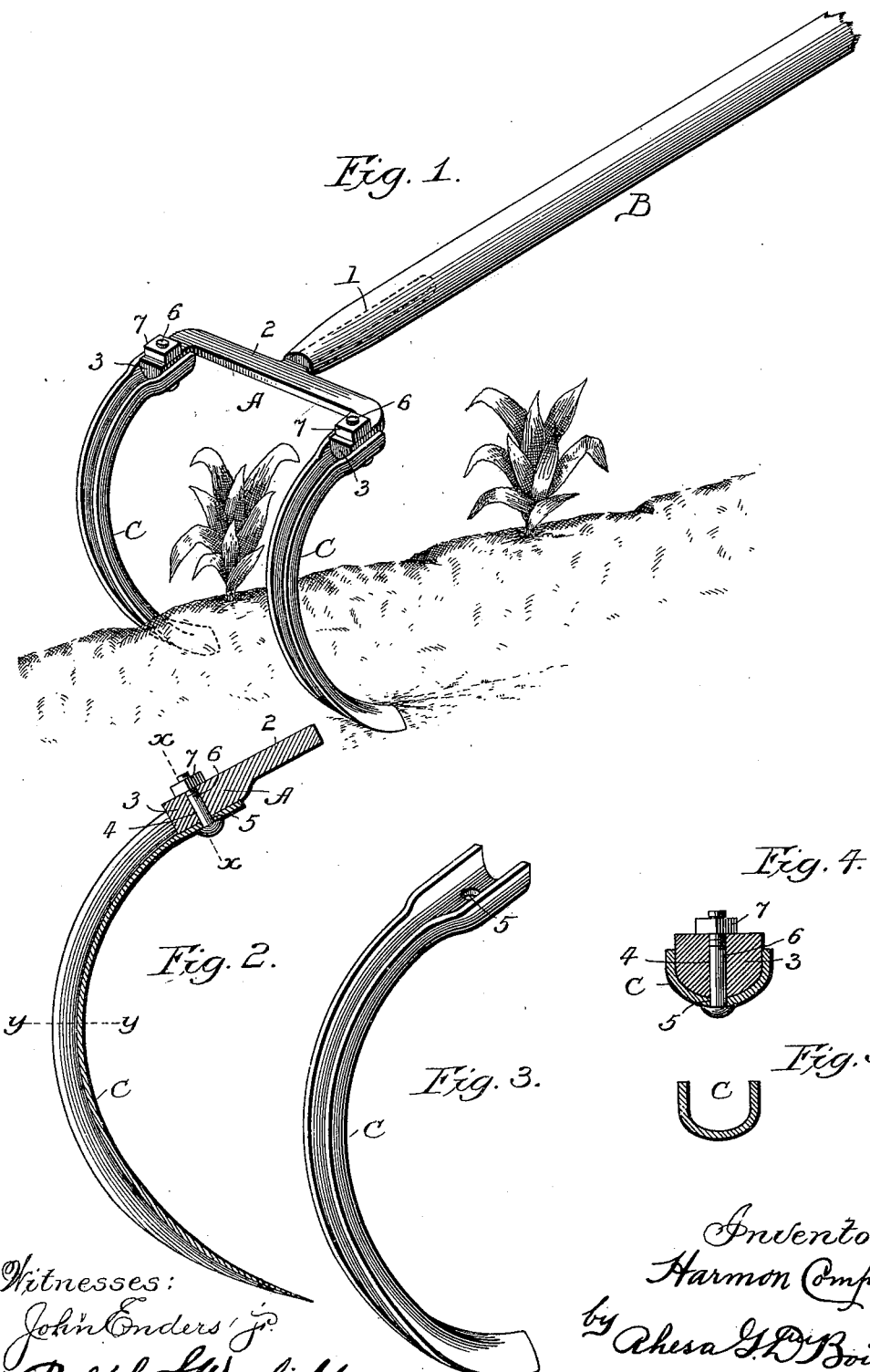

United States Patent Office.

HARMON COMPTON, OF LYNNHAVEN, VIRGINIA.

HOE.

SPECIFICATION forming part of Letters Patent No. 634,393, dated October 3, 1899.

Application filed July 11, 1899. Serial No. 723,474. (No model.)

*To all whom it may concern:*

Be it known that I, HARMON COMPTON, a citizen of the United States of America, residing at Lynnhaven, Princess Anne county, State of Virginia, have invented certain new and useful Improvements in Hoes and Cultivators, of which the following is a specification.

My invention relates to an improvement in trucking hoes and cultivators, the object being to provide a simple, inexpensive, and light article to be manipulated by hand for stirring the soil simultaneously on both sides of the plant to be cultivated.

A further object is to provide a hoe consisting of few parts capable of being renewed and replaced easily and at a trifling expense.

A still further object is to provide an article which will be most effectual in lifting and pushing the leaves aside while it is accomplishing the work of stirring the soil and pulverizing it around and beneath the roots of the plant.

With the foregoing objects in view my invention consists in a T-shaped shank adapted to be secured to the ordinary hoe-handle in connection with rounded blades removably secured to said shank, said blades being of peculiar construction and adaptability for performing the functions intended.

My invention still further consists in certain novel features of construction and combinations of parts, as will be more fully described hereinafter, and particularly pointed out in the claims.

In the accompanying drawings, Figure 1 is a view in perspective of my improved hoe. Fig. 2 is a section view, and Fig. 3 is a detached view, of one of the blades.

A represents the shank. This comprises the tang 1, adapted to be inserted into and secured to the handle B. The shank also consists of the cross-head 2, which, together with the tang, gives it the general shape of the letter T. The outer ends of the cross-head extend forwardly, as at 3 3, and are provided each with a hole or aperture 4. The lower surfaces of these forward projections 3 3 are preferably rounded.

C C indicate the blades. These are similar in construction, being made, preferably, of sheet-steel struck up into the general shape shown—that is to say, having a general curve throughout their entire length and U-shaped in cross-section. Their outer ends are flattened out and sharpened to render their penetration or insertion into the soil easy. The upper ends of these blades are bent to fit the lower and outer edges of the projections 3 3, and holes 5 5 are formed in these ends of the blades. Bolts 6 6 are inserted through the holes 5 and 4 in the blades and projections, respectively, and the nuts 7 7 screwed upon their upper ends, retaining them in place.

The width of the cross-head might, of course, differ, according to the species of plant to be cultivated, and, in fact, other slight variations might be made.

An article thus constructed is light, cheap, simple, and easy to manipulate and above all most effectual in the work of cultivating plants. Owing to the general curve of the blade and their rounded forward surfaces they work easily through the leaves of plants without cutting or breaking them, and while the soil is being stirred and pulverized they keep the leaves from being covered. Again, it will be noted that a blade of this construction is easily sharpened when its edge becomes dulled, as it is but the work of a few moments to flatten out the lower end a trifle higher up and sharpen the edge as the blade wears away. It is equally easy to remove the blades when worn until useless and substitute new ones for them.

In truck-farming and in ordinary gardening this improved hoe is invaluable. It is well balanced, and hence easy to manipulate. Its points are small and sharp, thus rendering its penetration into the ground easy. The fact that it will straddle the plant makes it possible to cultivate on opposite sides simultaneously, thus reducing the amount of time and labor to each plant at least one-half. It is important also to note that the blades merely brush aside and lift the leaves of the plant, so that they are never damaged or buried.

Having thus fully described my invention, what I claim as new, and desire to secure by Letters Patent, is—

1. The combination with a T-shaped shank, of blades removably secured thereto, said blades having a general curve throughout their lengths and U-shaped in cross-section, their lower ends flattened and sharpened.

2. The combination with a T-shaped shank having forwardly-extending projections on their outer ends, said projections rounded on their lower surfaces and each having a hole therein, of blades made of sheet metal bent into a general curve throughout their lengths and U-shaped in cross-section, the outer ends of said blades flattened and sharpened and their inner ends fitted to the lower surfaces and the side edges of the projections on the shank and having holes therein, and securing devices passed through the holes in the blades and projections for removably securing said blades to the shank.

HARMON COMPTON.

In presence of—
E. B. MASON,
S. S. TISDALE.